United States Patent [19]

Lane, Jr.

[11] Patent Number: 4,503,300

[45] Date of Patent: Mar. 5, 1985

[54] CONTROL ASSEMBLY WITH MULTI-AXIS MOUNTING CONNECTION

[75] Inventor: Wendell C. Lane, Jr., Laurinburg, N.C.

[73] Assignee: Dana Corporation, Toledo, Ohio

[21] Appl. No.: 519,948

[22] Filed: Aug. 3, 1983

[51] Int. Cl.³ .............................................. H01H 9/00
[52] U.S. Cl. .............................. 200/61.54; 74/484 R; 200/61.85
[58] Field of Search ................. 74/484 R; 403/50, 51, 403/84, 90, 100; 200/61.54, 61.27–61.37, 61.85, 6 A; 180/177; 248/288.5, 284, 282, 274; 174/57

[56] References Cited

U.S. PATENT DOCUMENTS

| | | | |
|---|---|---|---|
| 625,917 | 5/1899 | Arnold | 248/274 |
| 1,320,775 | 11/1919 | Mather | 248/288.5 |
| 1,609,104 | 11/1926 | Basterreix | 200/163 |
| 1,709,619 | 4/1929 | Johnson | 200/155 |
| 1,854,302 | 4/1932 | Hansen | 248/279 |
| 2,596,632 | 5/1952 | Whitehead | 248/279 |
| 2,624,954 | 1/1953 | Watkins | 33/348 |
| 2,813,942 | 11/1957 | Binder | 200/61.54 |
| 2,861,501 | 11/1958 | Strelakos | 248/279 |
| 2,950,365 | 8/1960 | Bolstad | 200/61.54 X |
| 3,761,662 | 9/1973 | Charles | 200/153 D |

Primary Examiner—A. D. Pellinen
Assistant Examiner—Morris Ginsburg
Attorney, Agent, or Firm—F. B. McDonald; R. M. Leonardi

[57] ABSTRACT

A control housing is adjustably connected to a mounting base for relative orientation of the housing relative to the base. A pair of threaded members provides a means for permanently locking the housing at any selectable orientation. In a preferred embodiment, the mounting connection defines a universal joint which includes opposed yokes connected to an intermediate cross member by threaded fasteners. Upon selection of desired orientation of the housing, the fasteners may be tightened to permanently secure the housing in the selected orientation. In another embodiment, the mounting connection comprises a ball and socket joint, wherein the socket is threadably fixed to the base and the ball is fixed to the housing. The socket may be threadably drawn tightly against the ball to lock the housing into the selected angle.

9 Claims, 5 Drawing Figures

CONTROL ASSEMBLY WITH MULTI-AXIS MOUNTING CONNECTION

BACKGROUND OF THE INVENTION

This invention relates generally to the mounting of control apparatus, and particularly to the connection between a mounting base and the encasement portion or housing of such control apparatus.

Control apparatus including mounting bases of the prior art have not generally provided for multi-axially adjustable convenience, and particularly, where vehicular speed control devices have been involved. Most speed control devices have been of a simple "clamp-on" construction, wherein the control apparatus is literally clamped onto an existing turn signal arm, or provides replacement of the existing arm. However, where such devices have not involved the turn signal arm, such as those which mount directly onto a steering column, the devices have not been readily installed in desirable orientations as related to driver access and viewing. Most of such prior art devices have generally been subjected to the use of bracket adaptors and/or "cut-off" members which require bending of the brackets or other structures in order to obtain desired control housing orientation.

What is needed is a multi-axially adjustable control connection to position the control housing without the above-referenced requirements of cutting and bending.

SUMMARY OF THE INVENTION

The control assembly of the present invention provides a structure wherein orientation of the control housing is easily adjustable in at least two orthogonal planes. Moreover, the control housing orientation or angle is easily locked into a selected position at the convenience of the installer of the assembly, without requirements of cutting and bending of brackets and associated structures.

In a preferred embodiment, the control assembly includes a control housing which is connected to a mounting base by an adjustable mounting connection. The mounting connection in a first preferred embodiment defines a universal joint which permits simple orientation of the housing in at least two orthogonal planes relative to the mounting base. Threaded members are provided which permit the locking of the housing into any selected orientation. The universal joint includes first and second yokes, and a cross member joining the yokes, wherein the first yoke is affixed to the housing while the seond yoke is affixed to a mounting base. The mounting connection thus provides a means by which the housing may first be oriented, and then locked into selected orientation.

DETAILED DESCRIPTION OF PREFERRED EMBODIMENTS

Figure 1:
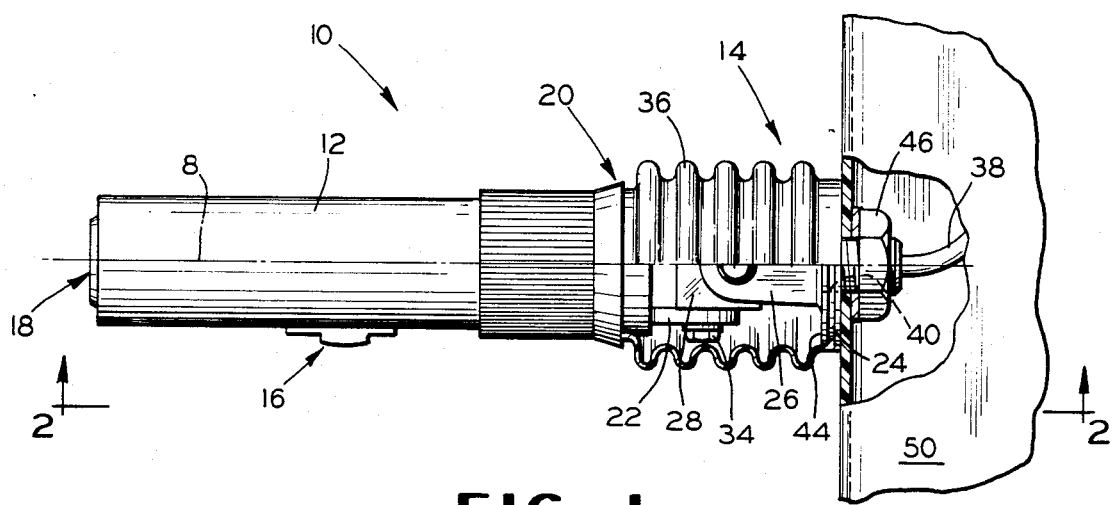
FIG. 1 is a plan view in partial cross-section of a preferred embodiment of the control assembly of the present invention.

Referring first to FIG. 1, a control assembly 10 is shown which includes a multi-axis mounting connection 14. The control assembly 10 includes a housing 12 having an axis 8 and containing at least one control device, as for example, a switch. A mounting base 24 is connected to one end 20 of the housing 12 through the mounting connection 14. As depicted herein, the assembly 10 defines a vehicular speed control apparatus which includes a conventional slide switch 16 and an end button switch 18 for providing (a) on, off, resume and acceleration functions, (b) set and coast functions, respectively.

Figure 2:
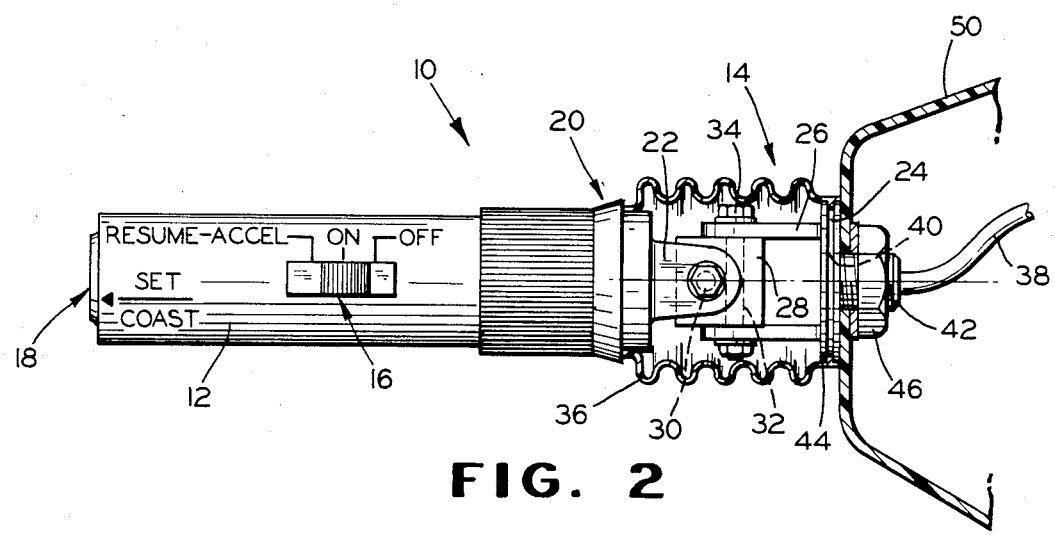
FIG. 2 is an elevation view of the same control assembly as viewed along lines 2—2 of FIG. 1.

Referring to FIG. 2, the mounting connection 14 in a first preferred embodiment is defined by a universal joint having a yoke 22 affixed to the end 20 of the housing 12. The mounting base 24 is secured to a mounting plate 50 as shown. The mounting plate 50 is depicted herein as a steering column shroud. Alternatively, the plate 50 could be part of a vehicular control panel as, for example, a dashboard or console. The mounting base 24 includes a companion yoke 26 affixed rigidly thereto, and a cross member 28 provides interconnection between the yokes 22 and 26. The cross member 28 defines a relatively cube-shaped structure in the preferred embodiment, and includes transverse but non-intersecting bores 30 and 32 which receive threaded connection members 34 for securement of the yokes 22 and 26. The threaded connection members also provide means for locking the orientation of the housing 12 relative to the base 24 upon achievement of a desired angle of the housing relative to the base.

As used herein, the terms "lock" or "locking" are employed to denote a securement of the housing 12 against being readily moved from a selected orientation relative to the base 24 during normal utilization of the control assembly switches. In the embodiments herein described, the locks are preferably frictional in nature, although mechanical locks are not precluded.

The universal joint 14 as defined by the yokes 22, 26, and cross member 28, provides for orientation of the housing axis 8 in at least two orthogonal planes of movement relative to the mounting base 24. Frictionally supported over the latter described mounting connection 14 is a boot 36 which, in the preferred embodiment, is made of an elastomeric composition. The boot is thus flexible to allow freedom of movement of the connection 14, and provides for containment and retention of lubricant, as well as a cover of the connection for aesthetic purposes.

An electrical conduit 38 extends axially of the housing 12 from the switches 16 and 18 to provide for interconnection between the latter switches and a speed control servomotor (not shown). The mounting base 24 includes an aperture 40 to allow passage of the conduit 38. A threaded sleeve 42 extends through the aperture 40 and thus carries the conduit 38 through the mounting base 24. In the first preferred embodiment, the threaded sleeve 42 has a fixed nut 44 on one end and an adjustable nut 46 on the other end, whereby tightening of the mounting base 24 against the mounting plate 50 may be effected.

Figure 3:
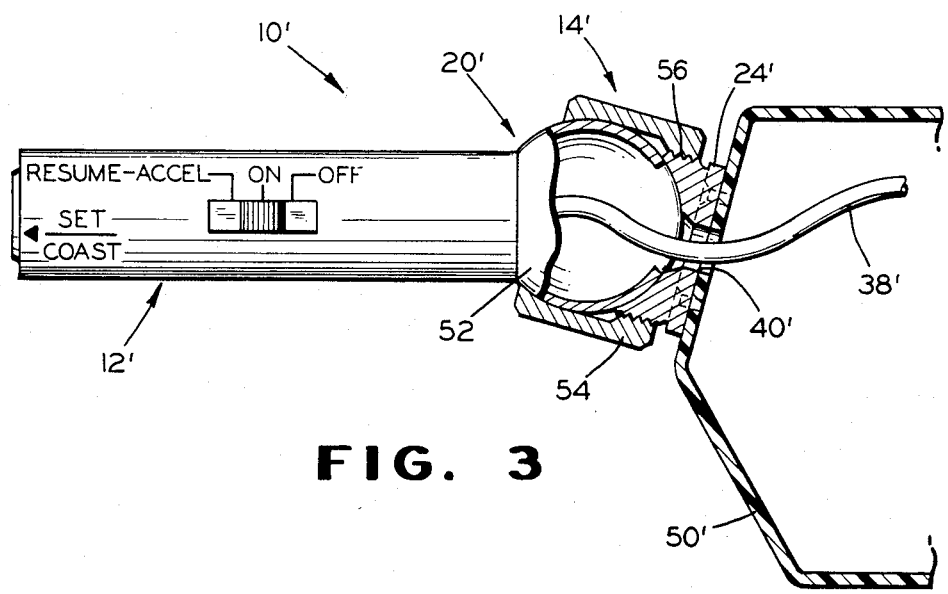
FIG. 3 is an elevation view of an alternate preferred embodiment of the control assembly of the present invention.

Referring to FIG. 3, a second embodiment of the control assembly 10' also includes an elongate housing 12' a mounting connection 14', and a mounting base 24'. The mounting base 24' is secured to a mounting plate 50', and as in the first preferred embodiment, a connection end 20' of the housing 12' is affixed to the mounting connection 14'. However, the mounting connection 14' is defined by a ball and socket joint which includes a ball 52 affixed to the connection end 20' of the housing 12'. A companion ball receiving socket 54 is fixed to the mounting base 24', and the socket is disposed for receiving securely, but adjustably, the ball 52. Upon adjustment of the housing 12', mating threaded portions 56 on the mounting base and socket may be tightened to provide for a securement or locking of desired orientation of the housing 12'.

Figure 4:
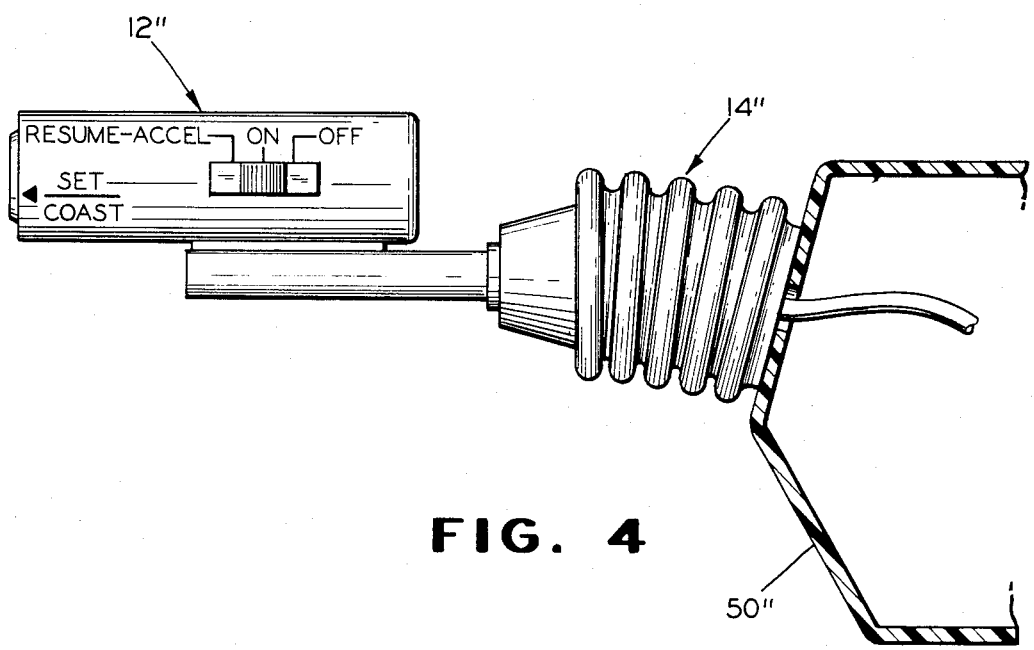
FIGS. 4 and 5 are elevation views of additional alternate embodiments of the control assembly.

FIG. 4 shows a third embodiment of a mounting connection 14" wherein a corrugated cylinder of relative soft metal, as aluminum, is defined. The installer can simply flex the cylinder to provide desired orientation of the housing. Optionally, the cylinder may then be enshrouded with an epoxy of the type which can be air-cured to lock the housing, if necessary or required depending on ease of flexure of the cylinder.

Figure 5:
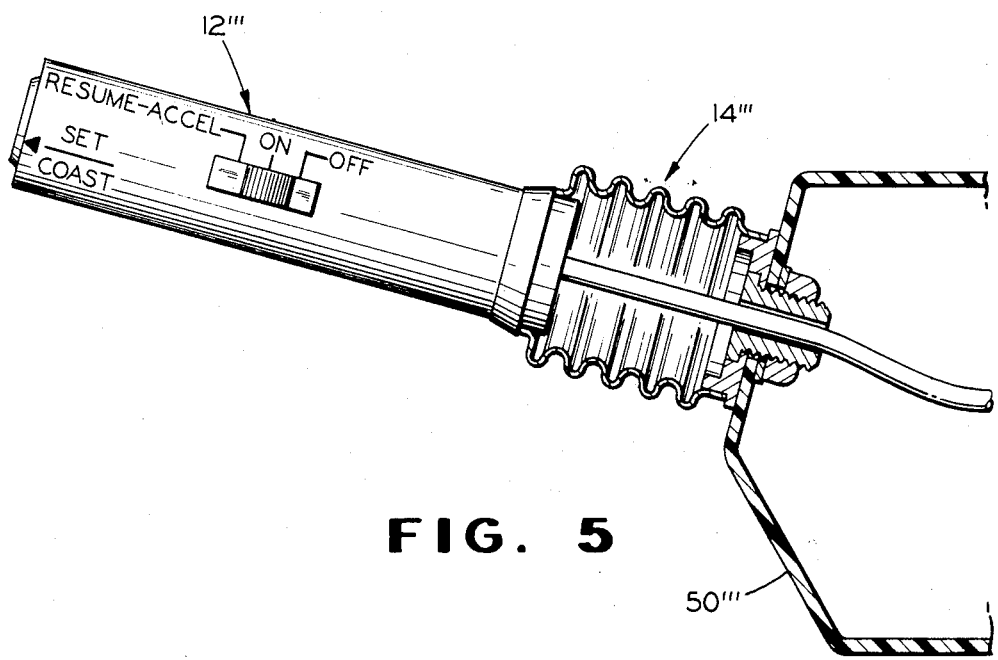

FIG. 5 shows a fourth embodiment of a mounting connection 14''' wherein a corrugated metal cylinder is utilized. The cylinder of the latter is hollow, as opposed to the solid cylinder of FIG. 4.

The embodiments as herein described are but three of many variations envisioned to fall under the appended claims.

What is claimed is:

1. A vehicular speed control switch assembly comprising a control switch including a housing, a mounting base, and a mounting connection adjustably connecting said housing with said base, said mounting connection comprising (1) means for permitting orientation of said housing in at least two orthogonal planes of movement relative to said mounting connection, said means comprising said mounting base, first and second yokes, and a cross member joining said yokes together, said first yoke affixed to said housing, said second yoke affixed to said mounting base, and (2) means for locking said housing into a selected orientation, said means for locking said housing being sufficient to effect securement of said housing relative to said base during normal utilization of said control switch.

2. The control assembly of claim 1 wherein said means for locking said housing into said orientation comprises a pair of threaded members.

3. The control assembly of claim 1 further comprising at least one electrical lead, wherein said control housing comprises means for passage of said lead through said housing, and wherein said mounting base comprises an aperture therethrough for passage of said lead.

4. The control assembly of claim 3 further comprising an externally threaded sleeve, said sleeve extending through said aperture of said mounting base, and means on said sleeve for affixation of said mounting base to a mounting surface.

5. The control assembly of claim 4 wherein said threaded sleeve comprises means for passage of said electrical lead through said mounting surface.

6. The control switch assembly of claim 1 wherein said mounting base is affixed to a steering shroud.

7. The control switch assembly of claim 1 wherein said mounting base is affixed to a vehicular control panel.

8. The control switch assembly of claim 1 wherein said means for locking said housing into a selected orientation comprises a frictional securement system.

9. The control switch assembly of claim 1 wherein said mounting base is affixed to a vehicular console.

* * * * *